UNITED STATES PATENT OFFICE.

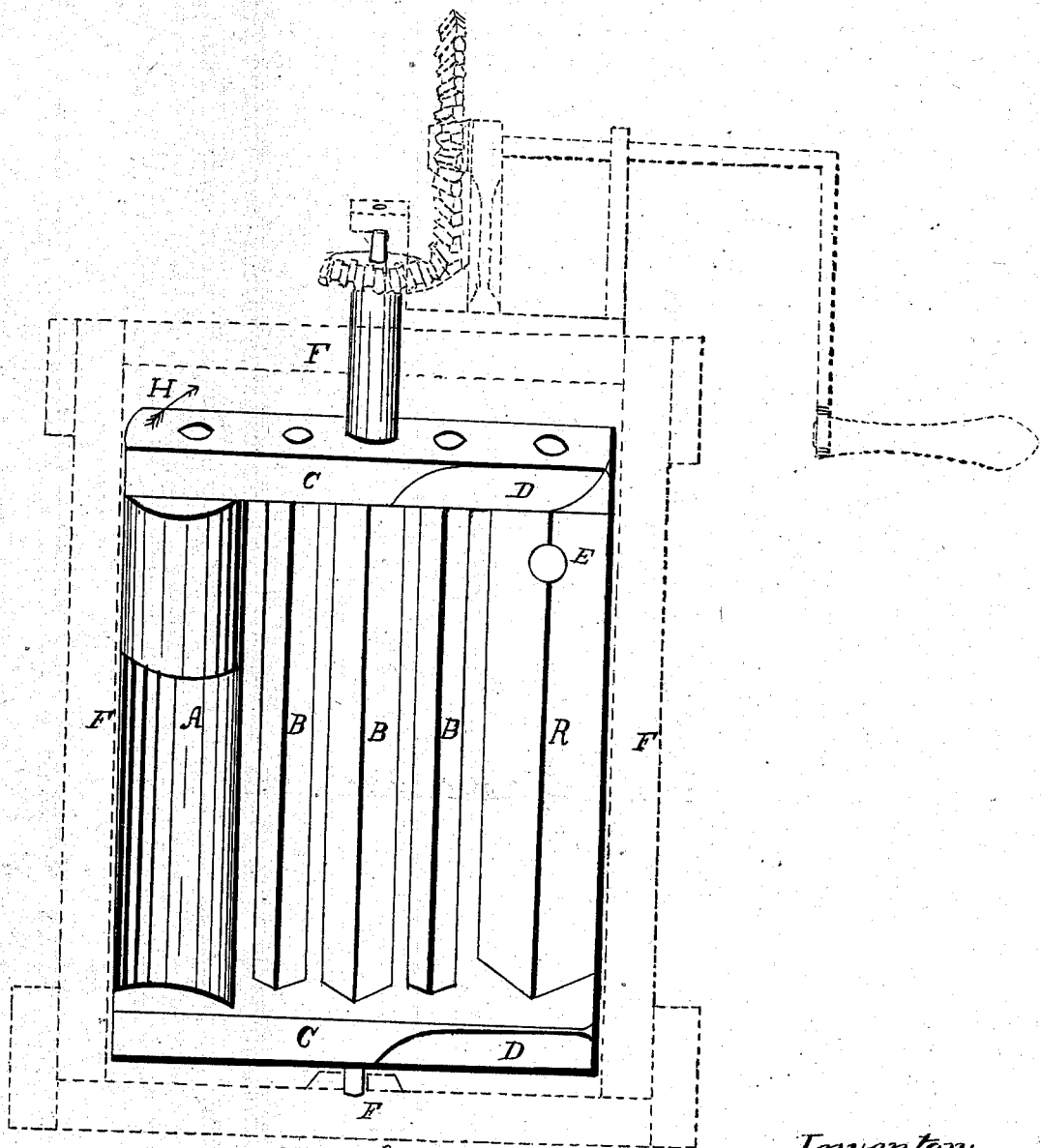

TIMOTHY ROSE, OF CORTLANDVILLE, NEW YORK.

IMPROVEMENT IN CHURNS.

Specification forming part of Letters Patent No. 35,628, dated June 17, 1862.

*To all whom it may concern:*

Be it known that I, TIMOTHY ROSE, of Cortlandville, in the county of Cortland and State of New York, have invented a new and useful Improvement in Churns, more particularly in the dash thereof; and I do hereby declare that the following is a full, clear, and exact description of the construction and operation of the same, reference being had to the annexed drawing, making a part of this specification, said drawing representing a sectional view of said churn with the dash in place.

F F represent the churn, which may be a square box or cylindrical, in which is placed a dash rotating upon a vertical shaft. Upon this shaft are securely placed the arms or cross-pieces C C, connected together by the slats or bars A A B B. The bars B B are made square and set diamonding, or with the angles or corners presented to the cream. The bars A A are made larger, and the front of each with an angular face. The rear may be either angular or convex faced for about one-third of its length from the upper end downward. The remaining two-thirds of its length is concave, so as to form a vacuum behind it when in motion, and this concave portion of the bars A A is connected with their front by a blind passage-way for air, E. The cross-pieces C C are beveled upon the faces meeting the cream upon their lower edges, as represented at D D.

Motion is given to the dash by means of a crank and gearing.

In operating this churn it should not be filled so that the cream would stand quite up to the air-passages E in the bars A A. On rotating the dash air is forced into the said air-passages and down through the bars A A into the concave portions thereof, and so brought into contact with and distributed through the contents of the churn. The bars B B admit more cream between than can pass through without being subjected to considerable pressure. The bars A A, having the like form in front, operate to press the cream in the same manner as well between them and the bars B B as between them and the sides of the churn; and I claim that the butter is thus produced by pressure rather than by beating or pounding, and is brought and made more solid and with slower motion and less expenditure of power than by the common methods. The bevels D on the lower cross-piece also press the cream upon the bottom of the churn as they revolve, while the bevels on the upper cross-piece serve to prevent the cream flying over it. I also fit into the top of my churn a permanent cover cut out in the center and at two opposite points in the sides, so as to permit of the removal of the dash and the butter, and then fit a movable cover in sections above this, which last arrangement is to prevent the escape and spattering of the cream.

What I claim, and desire to secure by Letters Patent, is—

The peculiar form and construction of the outer bars or slats of a vertical churn-dash, in combination with the middle bars, substantially as above described, with the object and for the purposes set forth.

TIMOTHY ROSE.

Witnesses:
CHAS. FOSTER,
S. R. HUNTER.